United States Patent Office 2,710,675
Patented June 14, 1955

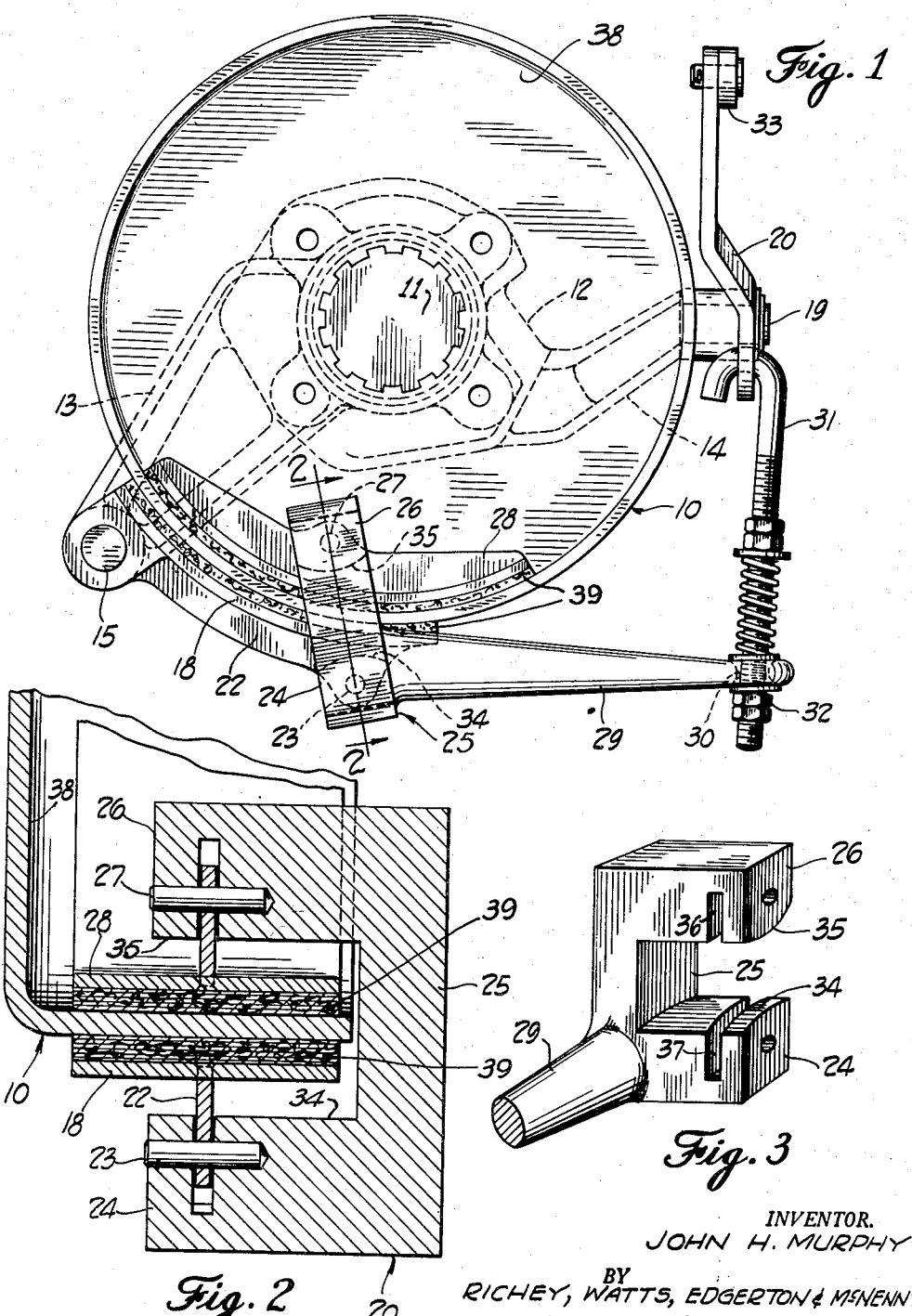

2,710,675
BRAKE ACTUATING MECHANISM

John H. Murphy, Detroit, Mich., assignor to Detroit Duo-Grip Brake Corporation, Detroit, Mich., a corporation of Michigan Application June 30, 1953, Serial No. 365,122

5 Claims. (Cl. 188—76)

This invention relates broadly to brakes for automotive vehicles and more specifically to improvements in the brake shoe actuating mechanism therefor.

The object of the invention resides in the provision of a forked bell crank which is constructed to draw the internal and external brake shoes into and out of engagement with the brake drum during the actuation thereof and at the same time restrain lateral movement thereof.

Further objects of the invention contemplate a brake shoe actuating mechanism which is economic of manufacture, sturdy of structure, durable, and efficient of operation.

Other objects and advantages, more or less ancillary to the foregoing, and the manner in which all the various objects are realized will appear in the following description, which, considered in connection with the accompanying drawing, sets forth the preferred embodiment of the invention.

Referring to the drawing:

Fig. 1 is a side elevational view of a brake assembly embodying the improved brake shoe actuating fork;

Fig. 2 is a vertical sectional view thereof, the section being taken on a plane indicated by the line 2—2 in Fig. 1; and Fig. 3 is a view in perspective of the improved fork.

The brake actuating fork described and claimed herein pertains to the brake structure disclosed in my copending application, Serial No. 194,689, filed November 8, 1950, now Patent No. 2,700,437, entitled "Brake Actuating Mechanism."

Referring first to Fig. 1, the brake drum 10 is secured to a drive flange (not shown) mounted on the splined end of a drive shaft 11 which protrudes from a cover plate 12 mounted on the rearward face of a transmission housing of conventional form. The cover plate 12 is formed with a downwardly and outwardly directed arm 13 on one side thereof for the support of the outer brake shoe and a laterally disposed bracket 14 on the opposed side thereof for the retention of the brake actuating linkage. The end of the arm 13 is drilled for the reception of a headed pin 15 constituting the fulcrum for the outer brake shoe 18, and the bracket 14 is bored to receive a pintle 19 for the pivotal support of a bell crank 20 embodied in the brake actuating assembly.

The brake shoe 18 comprises an arcuate drag plate formed to the contour of the brake drum and provided with a vertically disposed rib 22 along the medial axis thereof. The outer end of the rib 22 is drilled to receive the pin 15 and the opposite end thereof is machined for the reception of a second pin 23 mounted in the lower tine 24 of a brake shoe actuating fork 25. The upper tine 26 of the fork 25 is machined to retain a pin 27 supporting the inner brake shoe 28 which is similar in form to the brake shoe 18. The fork 25 is provided with an arm 29 having an opening 30 in the end thereof for the free oscillatory movement of a link 31 held in spring-pressed relation against a stop nut 32 on the end thereof. The upper end of the link is pivotally connected to the lower arm of the bell crank 20 while the upper arm of the crank is pivotally connected to the brake pull rod 33. The inner opposed faces 34 and 35 of the tines of the fork 25 are of arcuate form, the radius thereof being struck respectively from the medial axis of the pins 23 and 27. The body of the tines 24 and 26 of the fork are formed with kerfs 36 and 37 therein adapted to straddle the ribs 22 on the brake shoes 18 and 28 in order to maintain the shoes in aligned relation with each other and restrain lateral movement thereof relative to the longitudinal axis of the pin 15.

In operation the brake is applied by retraction of the pull rod 33 which rocks the bell crank 20 about its fulcrum 19 thus lifting the link 31 and effecting the consequent elevation of the outer end of the arm 29. As the fork rotates about its fulcrum pin 23 the distance between the inner faces 34 and 35 and the brake drum flange will be foreshortened until the friction material 39 on the opposed faces of the two shoes is drawn into impinged relation with the drum.

It will be recognized that the headed pin 15 will support the outer brake shoe 18 for oscillatory movement in a plane parallel to that of the inner wall 38 of the drum and that lateral movement of the inner shoe 28 is restrained by the interengaged relation of the rib 22 with the kerf or groove 36 in the tine 26 of the fork. It will also be recognized that the kerfs in the tines of the fork will cause both the inner and outer shoes to track concentrically on the opposed faces of the drum flange and thus eliminate side thrust and undue wear on the pins 23 and 27.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A brake comprising a flanged brake drum, a stationary arm adjacent the drum flange, a pin in said arm, an outer brake shoe fulcrumed at one end on said pin, a rib in the center of the outer face of said shoe disposed in normal relation thereto, a brake shoe actuating fork having the tines thereof arranged in straddled relation with the brake drum flange, said tines having slots in the inner opposed walls thereof, said rib being pivotally mounted in the slot in the outer tine adjacent the other end of the shoe, an inner brake shoe, a rib in the center of the outer face thereof disposed in normal relation thereto, the rib on the inner shoe being pivotally mounted adjacent the center thereof in the slot in the inner tine, a crank arm on said fork, and linkage connected therewith for rocking said fork about its pivotal support in the outer brake shoe.

2. A brake comprising a rotatively driven brake drum, a fixed anchor post adjacent the circumferential edge of the drum, an outer brake shoe mounted on said post, a fork having kerfs on the inner faces of the tines thereof disposed in confronting relation with each other, an inner brake shoe, vertically disposed ribs on the outer faces of said inner and outer brake shoes, said ribs being mounted within the kerfs and pivotally supported upon said tines, a crank arm on said fork, and linkage coupled therewith for rotating the fork about the pin in the outer brake shoe tine.

3. A brake comprising a flanged drum, an anchor post adjacent the rim thereof, an outer brake shoe fulcrumed at one end on said post, an inner brake shoe, a fork including a pair of legs disposed in straddled relation with said brake shoes and pivotally connected to each of said shoes, an arm on said fork for the oscillation thereof about the pivotal connection in the outer shoe, said fork having confronting grooves in the legs thereof, and vertical ribs on the outer faces of said shoes pivotally mounted within said grooves.

4. A brake comprising a rotatable flanged brake drum, a fixed post adjacent the rim thereof, an outer brake shoe fulcrumed at one end on said post, a fork having the tines thereof arranged in straddled relation with the brake drum flange, said outer shoe being pivoted adjacent the other end thereof to the outer tine of said fork, an inner brake shoe pivoted adjacent the center thereof to the inner tine of said fork, said tines having grooves in the confronting inner walls thereof, and ribs on said shoes pivotally mounted respectively in said grooves.

5. A brake assembly comprising a rotatable drum, a fixed anchor post adjacent the circumferential edge thereof, a brake shoe actuating fork including spaced tines disposed in straddled relation with the brake drum flange, an outer brake shoe fulcrumed on said post, an inner brake shoe, vertical ribs on the outer faces of said inner and outer brake shoes, pins in said tines pivotally connecting said ribs to said fork, shoulders on said tines engaging the side walls of said ribs to restrain lateral movement of the shoes, an arm on said fork constituting a bell crank, and a pull rod coupled with said arm to effect the oscillation of said fork about the pin in the tine that supports the outer brake shoe.

References Cited in the file of this patent

UNITED STATES PATENTS

| | | |
|---|---|---|
| 2,143,998 | Rosenberg | Jan. 17, 1939 |
| 2,239,977 | Rosenberg | Apr. 29, 1941 |